United States Patent [19]

Deering et al.

[11] 4,430,461
[45] Feb. 7, 1984

[54] METHOD OF REMOVING VOLATILES IN THE PREPARATION OF SILICONE COMPOSITIONS

[75] Inventors: Dana F. Deering, Clifton Park; Edward I. Stein, Ballston Lake, both of N.Y.

[73] Assignee: General Electric Company, Waterford, N.Y.

[21] Appl. No.: 347,808

[22] Filed: Feb. 11, 1982

Related U.S. Application Data

[63] Continuation of Ser. No. 155,690, Jun. 6, 1980, abandoned.

[51] Int. Cl.$^3$ .......................... C08G 77/34; C08J 3/00
[52] U.S. Cl. .................................... 523/340; 523/343; 524/588; 528/501; 159/47.1
[58] Field of Search ................ 524/588; 523/340, 343; 528/501; 159/47.1

[56] References Cited

U.S. PATENT DOCUMENTS

| | | | |
|---|---|---|---|
| 2,890,188 | 6/1959 | Konkle et al. | 524/492 |
| 2,954,357 | 9/1960 | Fekete | 524/264 |
| 3,287,322 | 11/1966 | Zimmer et al. | 528/501 |
| 3,464,945 | 9/1969 | Martellock | 524/724 |
| 3,660,345 | 5/1972 | Bobear | 524/588 |
| 3,704,100 | 11/1972 | Twilby et al. | 159/47.1 |
| 3,813,364 | 5/1974 | De Zuba et al. | 524/588 |
| 3,865,778 | 2/1975 | Christie | 524/588 |
| 3,888,815 | 6/1975 | Bessmer et al. | 524/703 |
| 4,061,609 | 12/1977 | Bobear | 524/703 |
| 4,100,129 | 7/1978 | Beers | 528/14 |
| 4,127,564 | 11/1978 | Sanborn | 528/501 |
| 4,153,501 | 5/1979 | Fink et al. | 528/501 |

*Primary Examiner*—Wilbert J. Briggs, Sr.

[57] ABSTRACT

A method of removing volatiles in the mixing of a heat vulcanizable silicone rubber composition comprising (a) mixing a diorganopolysiloxane polymer and filler in an enclosed heated vessel comprising heating the mixture above 100° C. and removing volatiles from the enclosed area above the mixing vessel by the use of aspirator means and collecting the volatiles. The mixing vessel is a Banbury mixing vessel.

6 Claims, 1 Drawing Figure

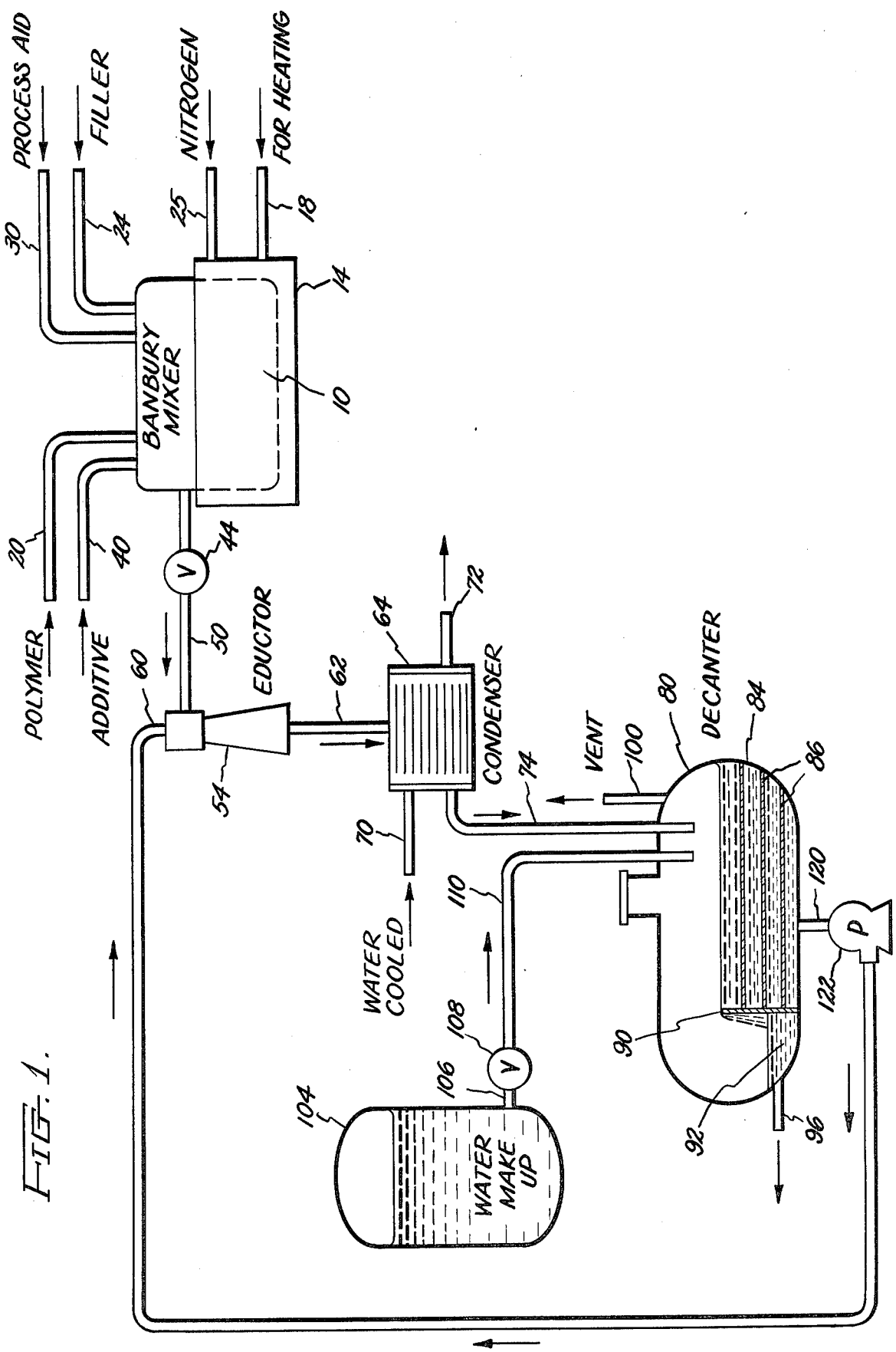

METHOD OF REMOVING VOLATILES IN THE PREPARATION OF SILICONE COMPOSITIONS

This application is a continuation of application Ser. No. 155,690, filed June 6, 1980 and now abandoned.

BACKGROUND OF THE INVENTION

The present invention relates to heat vulcanizable silicone rubber compositions and more particularly the present invention relates to the removable of volatiles from heat vulcanizable silicone rubber compositions.

Silicone elastomeric compositions are well known. Basically, there are two types of such compositions, room temperature vulcanizable silicone rubber compositions and heat vulcanizable silicone rubber compositions. The room temperature or RTV compositions comprise the one component type and the two component type. The two component type comprise a silanol diorganopolysiloxane polymer, optionally a filler, an alkyl silicate as a cross-linking agent and a metal salt of a carboxylic acid as the catalyst. The composition is packaged such that the alkyl silicate is packaged separately from the silanol polymer and when it is desired to cure the composition, the two packages are mixed and applied to cure to a silicone elastomer with a complete cure taking place in anywhere from 24 to 72 hours.

Then, there is another type of silicone RTV silicone rubber composition and specifically, the one component RTV composition. Such one component RTV composition comprises a silanol diorganopolysiloxane polymer as a base polymer, optionally a filler, an alkyoxy or acetoxy functional silane as a cross-linking agent and a metal salt or a carboxylic acid in the case of an acyloxy cross-linking agent and a titanium chelate catalyst in the case of the alkoxy cross-linking. In a one component system all the ingredients are mixed in a substantially anhydrous state. When it is desired to cure the composition, the seal on the package is broken and the composition is applied and exposed to atmospheric moisture whereupon due to the exposure to atmospheric moisture, the cross-linking agent hydrolyzes and cross-links the composition to a silicone elastomer with a complete cure taking place in anywhere from 24 to 72 hours. The advantage of the one component as distinguished from the two component system is that the two component system requires mixing on site to properly mix and prepare the composition when applying it to the form that is desired. Both of these compositions are distinguished by the fact that they cure to a silicone elastomer at room temperature.

There is another type of composition that cures at either room temperature or at elevated temperatures. This composition comprises a vinyl containing diorganopolysiloxane polymer, a hydride silicone resin, or a hydride polysiloxane cross-linking agent and a platinum catalyst as the catalyst. Normally such a composition is packaged in two components and is mixed in the proper ratios to cure to a silicone elastomer either at room temperature or very quickly at elevated temperatures. Such compositions which are called addition cured systems may utilize inhibitors such as that may be packaged in a single package at room temperature for long periods of time but will cure very rapidly at elevated temperatures, upon heating above 100° C. Such cured systems are not particularly referred to as heat vulcanizable silicone rubber compositions although they can be vulcanized at elevated temperatures.

The more traditional compositions to which this term applies comprises compositions which generally have the characteristics of having a diorganopolysiloxane gum as base polymer wherein the viscosity of the base polymer varies anywhere from 500,000 to 300,000,000 centipoise at 25° C. Preferably such a diorganopolysiloxane gum also contains certain amount of vinyl in it for use in cross-linking. Such a polymer also contains filler which may be a reinforcing filler such as fumed silica, precipated silica or an extending filler such as iron oxide, zinc oxide, and so forth. Such compositions have various types of additives in them as do the RTV compositions which in addition to the basic ingredient to give the composition certain advantageous properties which are desired for a particular use. Accordingly, such heat vulcanizable silicone rubber compositions may have rare earth octoates in them so as to give the composition desired compression set properties. The filler, in particular, the reinforcing fillers such as fumed silica or precipated silica, give the composition a high tensile strength. There may be incorporated into the composition platinum as a flame retardant additive. There may be also incorporated into the composition a second vinyl polymer with a higher content of vinyl than the base polymer so as to give the composition high strength properties. An examples of such a composition is, for instance, to be found in Bobear U.S. Pat. No. 3,660,345 which is hereby incorporated by reference.

An addition cured composition which is inhibited is to be found in the patent of William J. Bobear U.S. Pat. No. 4,061,609 which is hereby incorporated by reference. An example of a room temperature one component RTV composition which a brief description was given above is to be found in Beers U.S. Pat. No. 4,100,129. An example of a two component RTV composition of which the above was a brief description, is to be found in Bessimer et al U.S. Pat. No. 3,888,815 which is hereby incorporated by reference. All the above patents were given as examples of different types of composition which cure to a silicone elastomer.

However, proceeding with a heat vulcanizable silicone rubber composition, in addition to the gum, filler and the additives, there is another necessary ingredient in this composition; that is, an organic peroxide. The organic peroxide is utilized to cure the composition. The organic peroxide when heated at temperatures above 100° C. forms free radicals which attacks the diorganopolysiloxane gum and causes it to cross-link. Accordingly, since temperatures above 100° C. are necessary to activate the organic peroxide catalyst, these compositions are simply referred to as heat vulcanizable silicone rubber compositions. There may also be added self-bonding additives to such heat curable silicone rubber composition. An example of such heat curable silicone rubber composition is to be found in U.S. Pat. No. 3,813,364 which is hereby incorporated by reference.

Irrespective of the various additives that are present in the composition, such heat vulcanizable or heat curable silicone rubber compositions are utilized usually in the case where high strength is desired. That is, the composition cures to a silicone elastomer of high tensile strength. Accordingly, when a composition of high tensile stength is desired with various other types of properties such as flame retardant, self-bonding and whatnot, there is utilized a heat curable silicone rubber composition. The only deterent from utilizing it, is that the composition has to be heated at elevated temperatures to set or vulcanize to a silicone elastomer. Accordingly, the basic ingredient in such heat curable silicone rubber composition is a diorganopolysiloxane gum. The process by which this diorganopolysiloxane gum is prepared will be gone into below. However, what is necessary to mention now is that by the process by which such diorganopolysiloxane gums are prepared it is normal in such gums that as much as 15 percent by weight are volatiles. Such volatiles are normally low boiling cyclopolysiloxane and low molecular weight linear siloxane compounds. It is undesirable that the composition be cured with a peroxide at elevated temperatures with such volatiles in a diorganopolysiloxane gum. If such volatiles are present in a diorganopolysiloxane gum when it is cured to a silicone elastomer not only will the composition undesirably be reduced in weight due to the evaporation of some of the volatiles, but also there will be a decrease in the desired tensile strength, then a desired elongation and the desired compression set of the cured composition. The desired physical properties of the cured silicone elastomer are lowered when the diorganopolysiloxane gum is cured with the volatiles present in it. Accordingly, it has become a practice to remove the volatiles from the diorganopolysiloxane gum prior to or during the incorporation of the filler in the composition and prior to curing the composition with the organic peroxide. Normally such volatiles were removed by mixing the diorganopolysiloxane gum in a doughmixer along with silica filler wherein while the diorganopolysiloxane gum was being mixed with a filler and with a process aid present the gum was heated so that the volatiles were given off to the atmosphere. There was utilized in some case hoods for the removal of the volatiles from the doughmixers and the volatiles were vented to the atmosphere. However, with the advent of environmental restrictions this was not altogether possible.

In addition, processes are being developed for the utilization of such cyclics and low molecular siloxanes that is the volatiles for the production of polysiloxane polymers. Accordingly, it has become highly desirable to have an exacting and accurate process for removal of the volatiles from doughmixers so that they can be collected and either reused or incinerated or disposed as desired without contaminating the atmosphere of the workroom where the doughmixers are present. It is also desirable that the volatiles be removed and collected in as nearly pure form as possible such that they can be utilized in due course for the production of polysiloxane polymers.

Accordingly, it is one object of the present invention to provide a process for removing and collecting volatiles from a doughmixer in essentially pure form.

It is an additional object of the present invention to provide for a process for collecting volatiles in essentially pure form from a doughmixer in which a heat vulcanizable silicone rubber composition is being mixed in an expensive and efficient manner.

It is still an additional object of the present invention to provide a process for collecting the volatiles in an efficient and inexpensive manner from a Banbury mixing vessel in which there is mixed a heat vulcanizable silicone rubber composition.

It is yet an additional object of the present invention to provide for an efficient and inexpensive method for removing volatiles from a heat vulcanizable silicone rubber composition which is mixed in a Banbury mixer such that the volatiles can be segregated in an essentially pure form and without contamination of any effluent streams or the atmosphere.

These and other objects are accomplished by means of the disclosure set forth herein and below.

SUMMARY OF THE INVENTION

In accordance with the above objects, there is provided by the present invention a method of removing volatiles in the mixing of a heat vulcanizable silicone rubber composition comprising (a) mixing the diorganopolysiloxane polymer filler in a mixing vessel which is enclosed to form a mixture where the organo groups is a monovalent hydrocarbon radical (b) heating the mixture above 100° C. (c) removing the volatiles by aspirator means to produce a devolatilized mixture and (d) collecting the volatiles. By aspirator means it is meant in the instant invention the utilization of an eductor through which water is passed to create a suction on the enclosed area of a mixing vessel and cause the volatiles to be collected in the effluent stream passing through the eductor which is then passed through a condenser to cool the effluent to a temperature around room temperature whereupon most of the volatiles will be liquified from the corresponding gases. The liquified effluent with the volatiles is then passed into a decantor vessel with a weir arrangement or components such that the liquid volatiles are collected and disposed of in one way or another and the purified effluent is then recycled back to the educator, there is added more effluent to it as becomes necessary. The preferred effluent is, of course, water, since it is the cheapest to utilize and has the most desirable properties in the present process. However, as can be envisioned, other effluents, can be utilized. The preferred mixing vessel is a Banbury mixing vessel for the reasons that will set forth herein and below.

DESCRIPTION OF THE PREFERRED EMBODIMENT

The basic diorganopolysiloxane gum that is cured in the composition preferably has a viscosity of at least 500,000 centipoise at 25° C. and more preferably has a viscosity varying from 1,000,000 to 300,000,000 centipoise at 25° C. The polymer may have the formula

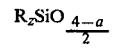

where R is a monovalent hydrocarbon radical and a varies from 1.95 to 2.01. In the above Formula (1) there is preferably 0.1 to 0.6 weight percent of vinyl radicals. Generally it is preferred that they be selected from vinyl or allyl radicals, aryl radicals, an halogenated aryl radical such as phenyl, chlorophenyl, toluene and so forth and aryl alkyl radicals such as phenylethyl, benzyl, etc.; aliphatic, haloaliphatic and cycloaliphatic such as alkyl, alkenyl, cycloalkyl, haloalkyl, including methyl, ethyl, propyl, chlorobutyl, cyclohexyl and so forth, cyanoalkyl such as cyanoethyl, cyanopropyl, cyanobutyl and so forth. Portions of the R radical may also be haloalkyl such as 3,3,3-trifluoropropyl. More preferably the R radical is selected from alkyl radicals of 1 to 8 carbon atoms, phenyl radicals, vinyl radicals, and 3,3,3-trifluoropropyl radicals. As stated previously, the most preferred radical for the R radical is that a portion be vinyl and the rest of the radicals be alkyl radicals of 1 to 8 carbon atoms such a methyl.

Such diorganopolysiloxane polymers of Formula (1) are produced by methods well known in the art. Generally, initially, diorganodichlorosilanes are taken and hydrolyzed in water. The water and acid is removed from the hydrolyzate. By hydrolyzate it is meant a mixture of cyclic and low molecular weight linear diorganosiloxanes. To produce or obtain a nearly pure commercial high viscosity linear diorganopolysiloxane polymer, it is necessary that the polymer be produced from cyclopolysiloxanes or it has been necessary in the past. Accordingly, to the hydrolyzate there is added to an alkali metal hydroxide catalyst. Most preferably there is added anywhere from 0.01 to 5 percent of an alkali metal hydroxide catalyst such KOH. The resulting hydrolyzate with KOH is heated at elevated temperatures, that is, temperatures above 150° C. and there is preferentially distilled overhead cyclotetrasiloxane. The cyclotetrasiloxane is removed as they are distilled overhead or rfluxed overhead. By this cracking procedure with the alkali metal hydroxide catalyst there is preferentially distilled overhead a large amount of the cyclotetrasiloxanes. Utilizing this procedure a large portion of the hydrolyzate can be converted to cyclotetrasiloxanes when the amount of the tetrasiloxane being distilled overhead has decreased beyond the desirable level, the cyclotetrasiloxane is taken and stored in substantially pure form, that is, the cyclotetrasiloxane is distilled overhead in a substantially pure form and stored as such. Then these cyclotetrasiloxanes are taken and depending on the amount and type of substituent groups that is desired in the final polymer, they are mixed in those proportions. The cyclotetrasiloxanes are taken and mixed in the desired proportions, it is desired to have the different substituent groups in the final linear polymer. To this cyclotetrasiloxanes there is then added a small amount of alkali metal hydroxide catalyst. Generally there is added anywhere from 1 to 500 parts per million of KOH and more preferably 1 to 200 parts per million of KOH as the equilibration catalyst. There is also added to the equilibration mixture a chainstopper. A chainstopper is a triorganosilyl end-stopped low molecular weight linear diorganopolysiloxane compound. Under the equilibration reaction that follows the low molecular weight linear diorganopolysiloxane compound breaks up and the triorganosiloxy groups act as chainstopper for the linear polymer that is formed from the cyclotetrasiloxane. The more chainstopper that is utilized in the equilibration mixture the lower the final molecular weight of the polymers that are formed and the lower the viscosity. The smaller the amount of the chainstoppers that are utilized, the higher the molecular weight of the diorganopolysiloxane polymer that is formed and the higher the viscosity on the resulting polymer that is formed from the equilibration reaction. Examples of such chainstoppers are hexamethyldisiloxane, tetramethyldiethoxydisiloxane, diethyltetraethoxydisiloxane and divinyltetraethoxydisiloxane.

When all the ingredients are mixed together, the mixture is heated at temperature above 100° C. and more preferably above 150° C. for a period of time varying anywhere from 2 to 24 hours and more preferably for periods of time varying from 8 to 16 hours. During that time, the cyclic tetrasiloxanes get converted to linear polymers until about 85 percent of the cyclotetrasiloxanes have been converted to linear polymers. At that time, an equilibration is reached in which just as much as the cyclotetrasiloxanes are converted to linear polymers as there is of the linear polymers breaking up to form cyclotetrasiloxanes. At that point, equilibration mixture is cooled and there is added a neutralizing agent to the reaction mixture to neutralize the catalyst. Preferably, such a neutralizing agent is either phosphoric acid or more preferably a silyl phosphate. A silyl phosphate is preferred because it is a neutralizing and buffering agent for the alkali metal hydroxide catalyst and also it is soluable in the reaction mixture and will quickly neutralize the alkali metal hydroxide catalyst. After the reaction mixture is cooled, the unreacted cyclics are removed to yield the linear diorganopolysiloxane polymer of Formula (1). The diorganopolysiloxane polymer may be heated to a certain extent to remove or vent or strip off unreacted volatiles of cyclics. However, because of the not altogether very efficient mixing blades in the reaction vessel which are necessary for the initial reaction, not all the cyclics and volatiles can be stripped off efficiently in this manner. Accordingly, it is preferred to rid most of the remaining volatiles which may comprise as much as 3 to 12 percent by weight of the prodiorganopolysiloxane polymer gum in the subsequent mixing step.

Accordingly, after as much of the volatiles have been removed in the reactor by heating the mixture to elevated temperature, the gum can be sent to the doughmixer or the Banbury for incorporation of filler and the other ingredients and the subsequent removal of most of the volatiles in the diorganopolysiloxane gum. It should be noted that other than the removal of the unreacted cyclics it is not preferred to reheat the diorganopolysiloxane gums so as to strip enough cyclics and other volatiles. The mixture is preferably reheated in the doughmixer to incorporate the other ingredients into the gum and accordingly, a duel heating operation increasing the cost of preparing the final composition. Accordingly, it is preferred to remove the overhead volatiles from the diorganopolysiloxane gums by passing the diorganopolysiloxane gum to the doughmixer for the removal of volatiles as well as the incorporation of the other ingredients in the composition.

Accordingly, after the diorganopolysiloxane gum has not been subjected to a stripping procedure in the reactor, it will have volatiles content in the range of 5 to 12 percent by weight. When the diorganopolysiloxane gum has been subjected to a stripping procedure in the reactor vessel, after the neutralization step it is heated to above 130° C. so as to remove or strip off cyclics and other low boiling volatiles. The diorganopolysiloxane gum will have generally 1 to 3 weight percent of volatiles after it is subjected to the stripping procedure in the reactor. If the cyclics are stripped in the reactor then most likely the diorganopolysiloxane will be cold mixed in the doughmixer or in the Banbury mixing vessel with the other ingredients such as that disclosed below in which the utilization of the present invention will not be necessary. However, in most case since the stripping procedure in the reaction vessel is so inefficient the diorganopolysiloxane gum will not be stripped of volatiles in the reaction vessel in which it is formed; that is, it will not be reheated after the neutralization to strip off the present invention as will be discussed below. The heating step takes place, either in the doughmixer or in the Banbury. It should also be noted that certain of the diorganopolysiloxane gums which is not stripped or heated in the reaction vessel then it may not be necessary to subject it to the heating and stripping procedure of the instant invention but will be cold mixed since it is not desired to remove the volatiles from such a gum, that is, the gum that can be utilized to produce certain types of heat vulcanizable silicone rubber compositions even though the compositions do not have the optimum properties. The invention of the instant case applies to the hot mixing and stripping off volatiles in a doughmixer and Banbury and collecting the volatiles as well be outlined below. However, before proceeding to the invention it is necessary to look at the other types of ingredients that can be added to the diorganopolysiloxane gum in the doughmixer and in the Banbury. That is, the diorganopolysiloxane gum as formed above having a viscosity of at least 500,000 centipoise, more preferably having a viscosity in the range of 1,000,000 to 300,000,000 centipoise at 25° C. will be taken and placed in the Banbury mixing vessel or in a doughmixer vessel which is enclosed and subjected to the stripping of volatiles process set forth herein and below. Simultaneously in the stripping off of the volatiles in the Banbury mixing vessel or in the doughmixer mixing vessel there will be added other ingredients to the diorganopolysiloxane gum. Accordingly, the other ingredients that will be added are, for instance, a filler.

In producing the silicone rubber composition of the present invention, there is utilized any of the filler materials of the highly reinforcing types consisting of inorganic compounds or any suitable combination of such filler materials employed in the production of elastomers as is customary in the prior art. There is preferably employed finely divided silica base fillers of the highly reinforcing type which are characterized by a particle diameter of less than 500 millimicrons and by surface areas of greater than 50 square meters per gram. Inorganic filler materials of a composition other than those preferred can be employed alone or in combination with the preferred fillers with good results. Such filler materials as titanium, iron oxide, aluminum oxide, as well as the inorganic filler materials known as inert fillers which can include among others, diatomaceous earth, calcium carbonate and quartz, can preferably be employed in combination with highly reinforcing silica fillers to improve the tensile strength or the hardness of the elastomeric product. Other examples of suitable fillers are diatomaceous silica, aluminum silicate, zinc oxides, zirconium silicate, barium sulfcate, zinc sulfide, aluminum silicate and finely divided silica having surface-bonded alkoxy groups.

There is preferably employed in the present composition 10–100 percent by weight of said polysiloxane gum of the inorganic filler and preferably 20 to 60 percent by weight.

There is also employed in the present composition 1 to 25 percent and preferably 5 to 15 percent by weight based on the polydiorganosiloxane gum of a process aid for presenting the gum and the filler mixture from structuring prior to curing and after compounding. One example of such a process aid is a compound of the formula,

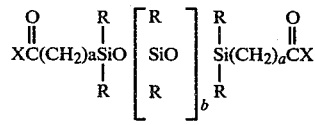

where R is a member selected from the class consisting of methyl and phenyl, X is a member selected from the class consisting of —OH, —NH$_2$ or —OR′, where R′ is methyl or ethyl, n has a value of from 2 to 4, inclusive, and b is a whole number equial to from 1 to 10, inclusive. Further details as to the properties, as well as the method of preparation of the above compound are to be found in the disclosure of Martellock, U.S. Pat. No. 3,464,945, which is herein incorporated by reference.

The process aid may also be a dihydrocarbon-substituted polysiloxane oil having a hydrocarbon substituent to silicon atom ratio of from 1.6 to 2.0 and whose hydrocarbon substituents comprise at least one member selected from the class consisting of methyl, ethyl, vinyl, allyl, cyclohexenyl and phenyl groups, said polysiloxane oil comprising polysiloxane molecules containing an average of from one to two lower alkoxy groups bonded to each of the terminal silicon atoms where the alkoxy groups are selected from the class consisting of methoxy, ethoxy, propoxy and butoxy.

Preparation of the alkoxy-containing hydrocarbon-substituted polysiloxane oils that can be employed as a process aid in the present invention can be carried out by producing one or more types of cyclic dihydrocarbon-substituted polysiloxanes from one or more types of dihydrocarbon-substituted dichlorosilanes and dialkoxysilanes in accordance with the hydrolysis, depolymerization and functional distillation procedures described in detail above with reference to the preparation of the gum of Formula (1). Then one or more types of cyclic siloxanes so produced are mixed with predetermined amounts of a dihydrocarbon-substituted dialkoxysilane and the mixture is subjected to an equilibration treatment under controlled conditions to produce the desired alkoxy end-blocked hydrocarbon-substituted linear polysiloxane oil.

The alkoxy-containing hydrocarbon-substituted polysiloxane oils suitable for use in the present invention are relatively low molecular weight polysiloxane oils whose polymer chains have at least four and as much as thirty-five and more dihydrocarbon siloxy units per molecule. The polysiloxane oils preferably have an average of at least one and not more than two alkoxy groups bonded to each of the terminal silicon atoms of the molecule. A more detailed disclosure of the alkoxy end-blocked polysiloxane process aids, as well as their method of preparation is to be found in the disclosure of Fekete, U.S. Pat. No. 2,954,357 which is hereby incorporated into this specification by reference.

There may also be used as a process aid hydroxylated organosilanes which contain from one silicon-bonded hydroxyl per 70 silicon atoms to two silicon-bonded hydroxyls per silicon atom and contains from 1.9 to 2.1 hydrocarbon radicals per silicon atom. The remaining valences of the silicon atom are satisfied by oxygen atoms. The hydroxylated materials include both monomers such as diphenylsilanediol and polymeric materials which contain two silicon-bonded OH groups in the molecule. In addition, the hydroxylated organosilane may be a mixture of hydroxyl-containing siloxanes and completely condensed siloxanes. Irrespective of the particular composition of the hydroxylated organosiloxane. It is necessary that there by present in said organosiloxane from one OH to 70 silicon atoms to two OH per silicon atom.

The hydroxylated siloxanes may be prepared by any suitable method, such as heating said siloxanes with steam under pressure at temperatures of about 120° C., or hydrolyzing silanes of the formula $R_nSiX_{4-n}$ where X is any hydrolyzable group such as Cl, OH, H.—OOR and R is a monovalent hydrocarbon radical. The former method is preferred for the preparation of those hydroxylated materials in which the hydrocarbon radicals are alkyl, while the latter method is best for the siloxanes in which hydrocarbon radicals are monocyclic aryl hydrocarbon radicals. Further, detailed information as to the hydroxylated organosiloxanes which may be used as process aids is to be found in Konkle et al., U.S. Pat. No. 2,890,188, the disclosure of which is being incorporated into this application by reference.

Any of the above process aids may be used alone or mixtures thereof may be used in the above-defined concentrations. Further, other suitable process aids may also be used in the silicone rubber compositions of the present invention.

The curing of the silicone rubber composition of the present invention can be effected by chemical vulcanizing agents or high energy electron radiation. More often, chemical vulcanizing agents are employed for the curing operation and any of the conventional curing agents can be employed. The preferred curing agents are organic peroxides conventionally used to cure silicone elastomers. Especially suitable are the dimethyl peroxides which may have the structural formulas,

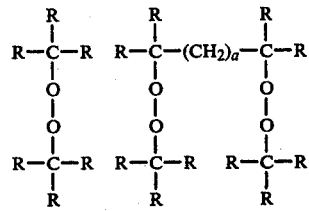

wherein R represent the same alkyl group throughout or alkyl groups of two or more different types and n is zero or a larger integer.

Among the specific peroxide curing catalysts that preferred are di-tertiary-butyl peroxide, tertiary-butyl-triethylmethyl peroxide, tertiary-butyl-tertiary-butyl-tertiary-triphenyl peroxide, t-butyl perbenzoate and a ditertiary alkyl peroxide such as dicumyl peroxide. Other suitable peroxide catalysts which effect curing through saturated as well as unsaturated hydrocarbon groups on the silicon chain are aryl peroxides which include benzoyl peroxides, mixed alkyl-aryl peroxides which include tertiary-butyl perbenzoate, chloroalkyl peroxides such as, 1,4-dichlorobenzoyl peroxide; 2,4-dichlorobenzoyl peroxide, monochlorobenzoyl peroxide, benzoyl peroxide, methylethylketone peroxide, azo-bis-isobutyronitrile, etc. Generally, 0.1 to 8 percent of said peroxide by weight of the polydiorganosiloxane gum is used to cure the silicone rubber composition and preferably 0.5–3.0 percent by weight of the above curing catalyst t-butyl perbenzoate is preferred.

Besides the process aids, the fillers and various other additives that added in the Banbury mixing vessel or in the doughmixer mixing vessel, it should be noted there is utilized an organic peroxide catalyst, as specified above, as the curing agent. However, it should be noted that the organic peroxide catalyst is not added to the composition in either the Banbury mixing vessel or in the doughmixer since the composition would cure. Rather, after the composition has been mixed in the Banbury or the doughmixer with all the other ingredients and after it has been processed, as will be outlined below, before it is cured to the final form or shape that it is desired to put it in, it is mixed with the organic peroxide on a mill and then from the mill it is extruded in the desired form and heated at elevated temperatures so as to cure the composition. It should be noted that if the organic peroxide was added to the other ingredients in the Banbury mixing vessel or in the doughmixer, then the composition would cure to a silicone elastomer. It should also be noted that there may be added to the composition in the doughmixer or in the Banbury mixing vessel, the self-bonding additives of U.S. Pat. No. 3,813,364, which are hereby incorporated by reference.

In addition to the fillers, process aid, curing catalyst and the isocyanurate or cyanurate, the organopolysiloxane composition of the present invention can also contain structure control additives, pigments, heat stabilizers, etc. Examples of heat stabilizers are iron oxide, aryl urethanes, etc., which can be employed in proportions up to 5 parts per 100 parts of the organopolysiloxane polymer of Formula (1). In the practice of the invention the organopolysiloxane composition is produced by forming a mixture of the organopolysiloxane polymer, filler, process aid and isocyanurate or cyanurate material, a structure control additive and a heat stabilizer. The order of addition of the various ingredients is not critical. For example, the various ingredients or mixtures can be blended together by use of standard rubber mixing equipment, such as a doughmixer, rubber mill, Banbury and the like. One procedure, for example, is to add the filler to the polymer while it is being milled, followed by the addition of the isocyanurate, or silylisocyanurate, or cyanurate of silylcyanurate or a mixture thereof, heat stabilizers, plasticizers, curing catalyst, etc., to the polymer filler blend while it is milled in the rubber mill. Those skilled in the art would know, depending upon the properties desired in the final cured product and applications to which the cured product is to be employed, the nature and the amount of the particular ingredients utilized and the manner of blending to produce the desired organopolysiloxane compositions. The organopolysiloxane composition can be converted to the solid elastomer state at temperatures in the range of from 80° C. to 650° C., depending upon the nature of the curing catalyst, duration of the cure, amount and type of filler, etc. The direct conversion of the organopolysiloxane composition to the cured, solid, elastic state can be effected as a result of the conditions normally utilized during the conventional molding, extrusion and calendering operations. For example, depending upon the curing catalyst used, a temperature of 80° C. to 300° C. can be employed for compression and transfer molding for either 30 minutes or more, or a minute or less. Hot air vulcanization temperatures from 150° C. to 650° C. or steam vulcanization at temperatures between 110° C. to 210° C. can be employed for periods of from 5 to 10 minutes or a matter of seconds during extrusion operation, again depending upon the curing catalyst used.

The composition in accordance with the instant invention, that is, the diorganopolysiloxane gum, is mixed with the various ingredients in either a doughmixer or a Banbury mixer. A doughmixer is simply a large vessel which can be heated and which contains in it circular blades which slowly mix the ingredients that are placed in the composition into a pasty mass. A Banbury mixing vessel is a much more efficient mixing vessel and generally comprises the following structure.

A Banbury mixer is an internal, batch mixer consisting of the following functional parts, (1) a pneumatic (air) cylinder with a ram head to contain the compound in the mixing chamber (2) a feed hopper where bulk material is introduced through the open door, (3) a mixing chamber (4) two rotors which do the mixing, and, (5) a discharge door through which the finished batch is released/dropped. The intensive mixing is provided by the two rotors which turn towards each other within the mixing chamber and at unequal speeds. The mixing action preformed by these rotors accomplishes a complete mixing job by working the input materials as follows (1) Blending, which means every portion of the batch contains the same proportion of the ingredients (2) Dispersing, which means the ingredients are dispersed homogeneously (3) mixing by combining the ingredients which have been evenly blended and completely dispersed.

For cold mixing it takes approximately 12 minutes to mix 500 pounds in the Banbury mixing vessel of a given type of a heat vulcanizable silicone rubber composition. With the same ingredients and a 5000 pound batch in a doughmixer it takes 10 hours in wich the mixture is mixed in a cold mix, that is, without heating. Similarly, in a hot mixing procedure of a given heat vulcanizable silicone rubber composition it takes 30 to 45 minutes total cycle time to mix 500 pounds in a Banbury mixing vessel.

For the same composition with the same ingredients it takes a total mixing time for a hot mix in a doughmixer, 24 hours in which the batch is 5000 pounds. Accordingly, even though a doughmixer accommodates a much larger weight of composition than the Banbury, it is a much less efficient mixing vessel than is the Banbury mixing vessel. Accordingly, the Banbury mixing vessel is preferred to the doughmixer for the mixing of heat vulcanizable silicone rubber composition in the most efficient manner. With that, we will proceed to FIG. 1 of the instant case.

FIG. 1 is a schematic diagram of the process of the instant invention. The drawing in FIG. 1 shows a Banbury mixing vessel (10) and which has an external heating jacket (14) where steam and other heating means are fed to the jacket (14) through line (18) in order to heat Banbury mixing vessel (10) to the exact temperature. It should be noted that the Banbury mixing vessel may be an enclosed doughmixer for purposes of the present invention, although, as stated previously, a Banbury mixing vessel is preferred for utilization in the instant case for the reasons set forth previously.

The diorganopolysiloxane gum is first fed to the Banbury mixing vessel through line (20) right from the reaction vessel or for instance, the diorganopolysiloxane gum may be stored first before it is fed to the Banbury mixing vessel.

Filler is fed to the Banbury mixing vessel through line (24) as well as the process aid through line (30) and all types of additives through line (40). Any of the additives mentioned previously may be added to the Banbury mixing vessel in the sequence desired. As pointed out previously, any of the foregoing additives may be added to this Banbury mixing composition and, in fact, even ingredients that have not been mentioned above but which are normally added to heat vulcanizable silicone rubber compositions may be added either during the initial point afte the diorganopolysiloxane gum has been added to the Banbury mixing vessel or during the mixing and heating of the diorganopolysiloxane gum. Along with the diorganopolysiloxane gum there is preferably added, the process aid and the filler and preferably the process aid is added in line (30) as soon as the filler (24) is added. Nitrogen gas is transferred through line (25) to prevent flammability problems. As soon as the filler is added to line (24) to the diorganopolysiloxane gum, which is added through line (20), to Banbury mixing vessel (10), the agitation is commercial and the vessel is heated to elevated temperatures. Preferably, the vessel is heated to a temperature above 100° C. More preferably, the vessel is heated at a temperature of 140° to 200° C. and more preferably heated at a temperature of 140° to 170° C. The whole heating cycle usually takes place from 5 to 30 minutes and more specifically from 5 to 20 minutes in a Banbury mixing vessel. However, if a doughmixer is utilized then the mixing is much more extensive and may extend for a period of 24 hours. The timing of the mixing cycle is determined by the type of mixing that is carried on in the vessel. To properly mix the composition to a uniform mass and remove the volatiles there is preferably present in the mixture after the mixing cycle is completed, less than 1 percent to 5 percent by weight of volatiles. It should be noted here that by volatiles it is meant cyclopolysiloxanes, low molecular weight siloxanes which are present in the diorganopolysiloxane gum, as a result of the process by which it is made. It should be noted also that the ingredients, in addition to the filler, may be added to the diorganopolysiloxane gum during the process of mixing the filler into the gum and during the heating cycle or the other ingredients, in addition to the process aid and the filler, may be added to the composition at the beginning.

Accordingly, after the heating cycle has begun, a valve (44) is opened in line (50) which leads to a eductor or aspirator (54). Effluent is fed to a eductor (54) through line (60). Although the effluent can be any high boiling liquid which is inert to the volatiles present or given off by the mixture in Banbury vessel, preferably it is not only inert but also is insoluble or immiscible with the volatiles that are given off from the Banbury mixing vessel (10) through line (50). An effluent which fits this description is water. Other effluents that may be utilized are as follows:

(1) Steam
(2) Silicone Oil

The effluent as it passes through the eductor (54) or aspirator (54) draws off the volatiles in the overhead space in the Banbury mixer (10) through line (50) and the volatiles and effluent pass through line (62) into condenser (64). Condenser (64) is cooled by a refrigerant passing in through line (70) and out through line (72). The refrigerent which passes through line (70) and passes into the condenser (64) through line (70) and out through line (72) need not be water but can be any other refrigerant. Preferably, the effluent and volatiles passing through line (62) into condenser (64) are cooled in the range of 0° to 50° C., or preferably from 0° to 25° C. and more preferably at about room temperature. The cooled volatiles and effluent then pass through line (62) through condenser (64) into line (74) into decanter tank (80) where the liquified volatiles and water accumulate in the tank area (84) where there are baffles (86) which help separate the top layer of volatiles since it is of lower specific gravity then the water. The top layer of volatiles then spills over weir wall (90) into pool (92) and out through line (96) as is desired. Accordingly, this way and through the baffles (86) as weir wall (90) there is accumulated a pure pool of volatiles (92) which is passed out through line (96) from decanter vessel (80) and disposed of as desired, that is, the volatiles can be incinerated or reutilized in the process to produce polysiloxane polymer. The decanter vessel (80) has vent (100) to rid the decanter vessel of a small amount of volatiles that are uncondensable at the condensing temperature of condenser (64). Less than 0.5% of the volatiles will be so uncondensable. Make up water as needed is fed from tank (104) through line (106) through valve (108) through line (110) into decanter vessel (80). The purified water or other effluent after it has purified in decanter (80) along with make up water as needed that enters into decanter vessel (80) through line (10) is then passed out through line (120) and pumped by pump (122) to line (60) and back to eductor (54) to be reutilized in educator (54) so as to suction off volatiles from Banbury mixture (10).

It should be noted that the removal of volatiles by this procedure and process and equipment as set forth in the case is only semi-continuous, there is no interruption in the process of the instant case in the inserting of the diorganopolysiloxane gum and ingredients in the Banbury mixture at the beginning of the heating cycle and the interruption of the cooling cycle when all the volatiles have been vented off and all the ingredients have been uniformly mixed to a heat vulcanizable silicone rubber composition in the Banbury mixer.

The only interruption in the continuous process of the instant case is the loading of the Banbury mixer and the unloading of the Banbury mixer with a heat vulcanizable silicone rubber composition. In the time period specified previously in the case of the doughmixer, the mixing time can vary from 16 to 32 hours and is generally in a period of time of 24 hours for a 5000 lb. batch while the mixing time of the Banbury mixing vessel is more efficient as been pointed out above. It should be noted that in the Banbury mixer or in the doughmixer even thought it is enclosed there may be a dust collector to remove silica particles in the atmosphere above the Banbury mixer or the doughmixer so these silica particles of fumed silica and precipitated silica do not get suctioned off along with the volatiles and pass into the decantor and collector. However, if they are suctioned off and there is not a dust collector, this does not create much of a problem except that there will be silica particles in the water effluent and there will be silica particles in the condensed volatiles in the decantor vessel (80).

When the heating cycle is over and there is less than 1 percent to 5 percent by weight of volatiles in the vulcanizable silicone rubber composition mixture there is dumped into the polymer mixture liquid carbon dioxide. Although the reactor can be cooled by allowing the vessel and its contents to come to room temperature, this takes too much time. Even passing refrigerant through the jacket of the mixing vessel takes too much time. It is found that the entire batch can be cooled in 6 to 7 minutes, down from 150° to 60° to 70° C. by the use of liquid $CO_2$. It has been found that the entire reaction mixture can be cooled to a temperature of 60° to 70° C. from a temperature of 150° C. in 6 or 7 minutes by simply dumping liquified carbon dioxide into the reaction mixture. Accordingly, by adopting this dumping of liquid carbon dioxide into the reaction mixture the process of cooling and disposing of the mixed batch takes place much faster and is a much more efficient utilization of the equipment.

After that the batch is taken out of the doughmixer or Banbury mixing vessel and passed into an extruder where it is extruded through a screen which removes the impurities. The composition after it has been extruded and strained through a screen to remove impurities can then be packaged and shipped or it can be milled and catalyzed with organic peroxides and then shipped whereupon the organic peroxide is added to the composition and is simply formed to the desired shape and heated at elevated temperatures to form a silicone elastomer. Where the organic peroxide is not so added, then when the composition arrives at the fabricator, the fabricator takes it, mills it, adds the desired amount or organic peroxide and then heats the composition after it is formed to the desired shape at elevated temperatures to form a silicone elastomer. Irrespective of which type of package is utilized, the composition which is stripped of volatiles in accordance with the instant invention will perform satisfactorily without degradation in properties as a heat vulcanizable silicone rubber elastomer. However, it should be noted that the invention of the instant case lies in the utilization of the stripping process and is appended to the Banbury mixer for the purpose of cheaply and efficiently removing the volatiles from a mixing vessel and segregating them in a relatively pure form that they be properly disposed off. It should be noted that preferably an inert gas atmosphere (such as nitrogen) is maintained above said mixing vessel to prevent flammability problems.

We claim:

1. An improved process for removing low molecular weight organosilicon volatiles in the mixing of an uncured heat vulcanizable silicone rubber composition consisting essentially of:
    (A) mixing:
        (a) a diorganopolysiloxane polymer having a viscosity varying from 1,000,000 to 300,000,000 centipoise at 25° C. where the organo groups are monovalent hydrocarbon radicals;
        (b) a filler selected from the class consisting of fumed silica and precipitated silica and
        (c) a process aid in a Banbury-type mixing vessel which encloses the mixture; said Banbury-type mixing vessel having an external heating jacket, means for adding additional ingredients and means for removing volatile ingredients; and
    (B) heating and continually mixing the mixture at 140° to 170° C. for 5 minutes to 30 minutes, the improvement consisting essentially of the additional steps of:
    (C) continuously removing the low molecular weight organosilicon volatiles from said mixture by the utilization of aspirator means, said aspirator means being operated by passing effluent through an eductor wherein the suction end of said eductor is connected to the area of said Banbury-type mixing vessel above said mixture;
    (D) condensing volatiles entrained in said effluent by cooling said effluent to about room temperature in a condenser means;
    (E) separating the condensed volatiles from said effluent by collecting the volatiles in a decanter vessel wherein the condensed volatiles are collected by means of a weir arrangement in the decantor vessel and wherein effluent is recycled to said eductor and new effluent being passed to the decanter vessel as needed; and (F) removing said condensed volatiles from said decantor vessel for disposal or reuse.

2. The process of claim 1 wherein there is added liquid $CO_2$ to said devolatilized mixture after the heating step is terminated so as to rapidly cool the mixer.

3. The process of claim 1 wherein a nitrogen atmosphere is maintained in the overhead area of said enclosed mixing vessel.

4. The process of claim 1 wherein the decantor vessel is vented to remove uncondensed volatiles.

5. The process of claim 1 wherein there is present in said mixing vessel a dust collector for removing filler particles from the atmosphere above the mixing vessel when said filler is mixed into said diorganopolysiloxane polymer.

6. The process of claim 1 wherein after said heating steps further comprising extruding the devolatilized mixture and passing said mixture through a screen to remove impurities thereby providing a purified devolatilized mixture and thereafter packaging said cured devolatilized mixture.

* * * * *